United States Patent [19]

Schmidt

[11] Patent Number: 5,433,248
[45] Date of Patent: Jul. 18, 1995

[54] SWITCHING VALVE

[75] Inventor: Peter Schmidt, Argenbühl/Eisenharz, Germany

[73] Assignee: Schmidt & Lenhardt GmbH & Co. oHG, Isny, Germany

[21] Appl. No.: 179,524

[22] Filed: Jan. 10, 1994

[30] Foreign Application Priority Data

Jan. 19, 1993 [EP] European Pat. Off. ............ 93100711

[51] Int. Cl.⁶ .............................................. F16K 11/02
[52] U.S. Cl. .............................. 137/625.48; 137/636.1; 137/867
[58] Field of Search ................. 137/625.48, 636.1, 867, 137/868

[56] References Cited

U.S. PATENT DOCUMENTS

| | | | |
|---|---|---|---|
| 2,387,007 | 10/1945 | Buchanan | 137/636.1 |
| 2,414,196 | 1/1947 | Geldhof et al. | 137/807 X |
| 2,860,660 | 11/1958 | Swatsworth | 137/625.48 X |
| 2,899,939 | 8/1959 | Norris | 137/625.48 X |
| 4,736,587 | 4/1988 | Suzuki | 137/625.48 X |

Primary Examiner—John C. Fox
Attorney, Agent, or Firm—Notaro & Michalos

[57] ABSTRACT

In an elongate housing (12), a valve body (30) comprising two annular chambers (36) is mounted so that it can be displaced longitudinally, one each of which communicates with a connection neck of the housing (12) via a radial hole (28). In the neutral position, a further central radial hole (28), which communicates with a water inlet, is sealed against the annular chambers (36) by O-rings (38). A pivotable rocker (44) with a broad surface has two operating extensions (50) which contact the front end of the valve body (30). By swivelling the rocker (44), the central radial hole (28) can be selectively connected to communicate with each of the two outer radial holes (28).

6 Claims, 3 Drawing Sheets

SWITCHING VALVE

BACKGROUND OF THE INVENTION

The invention relates to a switching valve for connection to a bathtub mixer tap with an inflow connection and two selectively activable outflow connections, consisting of a valve body adjustably disposed in a housing, and an operating element for adjusting the valve body.

PRIOR ART

Reversing valves of this kind are known, for example, in order to switch over from the bath tap to a shower attachment. In that case, they are as a rule integrated into the bathtub mixer tap and have a rotating valve body. They are operated via a swivel lever to turn the valve body. For connection to hydraulically operated lifting apparatus, which is needed by handicapped persons in order to lower themselves into the bathtub in a sitting position and to raise themselves back out again into a raised position, separate reversing valves or switches are used, which are screwed on to the connection point for the shower attachment. The shower attachment hose is firmly connected to this reversing valve, whereas the lifting apparatus is, as a rule, connected by means of a rapid-action coupling. There are a wide variety of different types of mixer tap, and the connection for the shower hose can be on the top, bottom, rear or side. The switching valve then needs to be mounted in the appropriate position. The operating lever for the switching valve is then frequently located in a very awkward position, so that it is difficult to operate for a handicapped person who does not have perfect control over his movements. Also, if the bath tap is located at the foot end of the bathtub, the problem occurs that the handicapped person cannot reach the switching valve, or only with great difficulty, so that switching over to the shower attachment is problematic.

SUMMARY OF THE INVENTION

The object of the invention is to design the switching valve of the type described at the beginning in such a way that, irrespective of the position of the bath tap relative to the bathtub, and irrespective of the arrangement of the shower attachment connection on the tap, it can easily be operated at any time by a handicapped person sitting on a lifting apparatus, who only needs to make a simple movement, using the back of his hand, for example.

This problem is solved according to the invention in that the valve body is mounted in an elongate, cylindrical chamber so that it can be displaced longitudinally, and the three connections, spaced apart longitudinally, terminate in the chamber at right angles to the longitudinal axis of the chamber, the central connection being the inflow connection; at the front, the valve body, in its central position, protrudes, on at least one side, out of the chamber; the operating element consists of a rocker protruding partially out of an aperture in the housing, said rocker being pivotably mounted in the housing in its longitudinal middle and having an operating extension at least on one end, said operating extension contacting the one end of the valve body at an operating surface which is designed in such a way that, when the end of the rocker adjacent to the operating extension is pressed down from a neutral position to a switching position, the valve body is displaced axially and connects the inflow connection, allowing it to communicate with one of the two outflow connections; and there is provided a resetting device which pushes the valve body back to the neutral position when the rocker is swivelled back.

The invention offers substantial advantages. First of all, the novel switching valve can be attached in a suitable position, e.g. on the bathroom wall in the centre of the bathtub, irrespective of the mixer tap, the inflow connection being made from the mixer tap via a flexible hose. The switching valve is thus within reach of the handicapped person even when he has lowered himself into the bathtub with the lifting apparatus. The broad surface of the rocker enables the handicapped person to switch over the valve by pressing a single time on one end of the rocker, which he can do with the back of his hand, for example, or even with his elbow. Finally, operating the valve body is likewise advantageous, because the rocker cooperates at the front with the valve body, so that sealing problems are avoided. Such problems can occur if the rocker engages with a central ridge in a recess of the valve body disposed in the centre of the valve body. Most of the advantages of the invention can also be achieved with such a design, which is why this alternative method of operating the rocker is likewise part of the subject matter of the invention, but precisely the fact of coupling the central operating arm of the rocker in a transverse recess provided on the circumference of the valve body makes it necessary to provide an additional seal for the valve body in the housing, which, as a rule, requires two additional sealing rings on both sides of the valve body recess.

In accordance with one alternative, the resetting device can be implemented by means of a spring. As soon as the operator operates the other arm of the rocker, the operating extension releases the valve body, so that it is pushed back to the neutral position by the resilient force of the spring; when the rocker is pushed fully down—preferably overcoming a locking position—, it moves to the other switching position.

A particularly simple and trouble-free alternative according to the invention consists in having the resetting device be comprised of a second operating extension, which—relative to the central plane of symmetry of the housing—is designed as a mirror image of the first operating extension and is disposed on the other longitudinal end of the rocker and cooperates with the other end of the valve body. With this design, therefore, the two operating extensions of the rocker form a fork which encloses the valve body at the front.

Other features and advantages of the invention form the subject matter of the other dependent claims. The switching valve consists of a small number of inexpensive individual components, the housing and the rocker being designed as injection-moulded plastic parts, and the three connections being formed integrally with the housing as screw necks, whereas the cylindrical chamber is preferably formed in a metal bushing, which is firmly anchored in the housing. Instead of the metal bushing, it is of course also possible to use a plastic bushing. The bushing could even be dispensed with, where appropriate, so that the cylindrical chamber for the valve body is formed in the housing itself.

The valve body is a cylindrical component the ends of which are preferably rounded. It has at least two sections with a smaller diameter in order to connect the inflow line to one of the two outflow lines in each case, O-rings being used in the portions adjacent to the sections of reduced diameter.

BRIEF DESCRIPTION OF THE DRAWINGS

The invention will now be described in more detail with reference to the drawing, which shows one embodiment.

DETAILED DESCRIPTION

Figure 1:
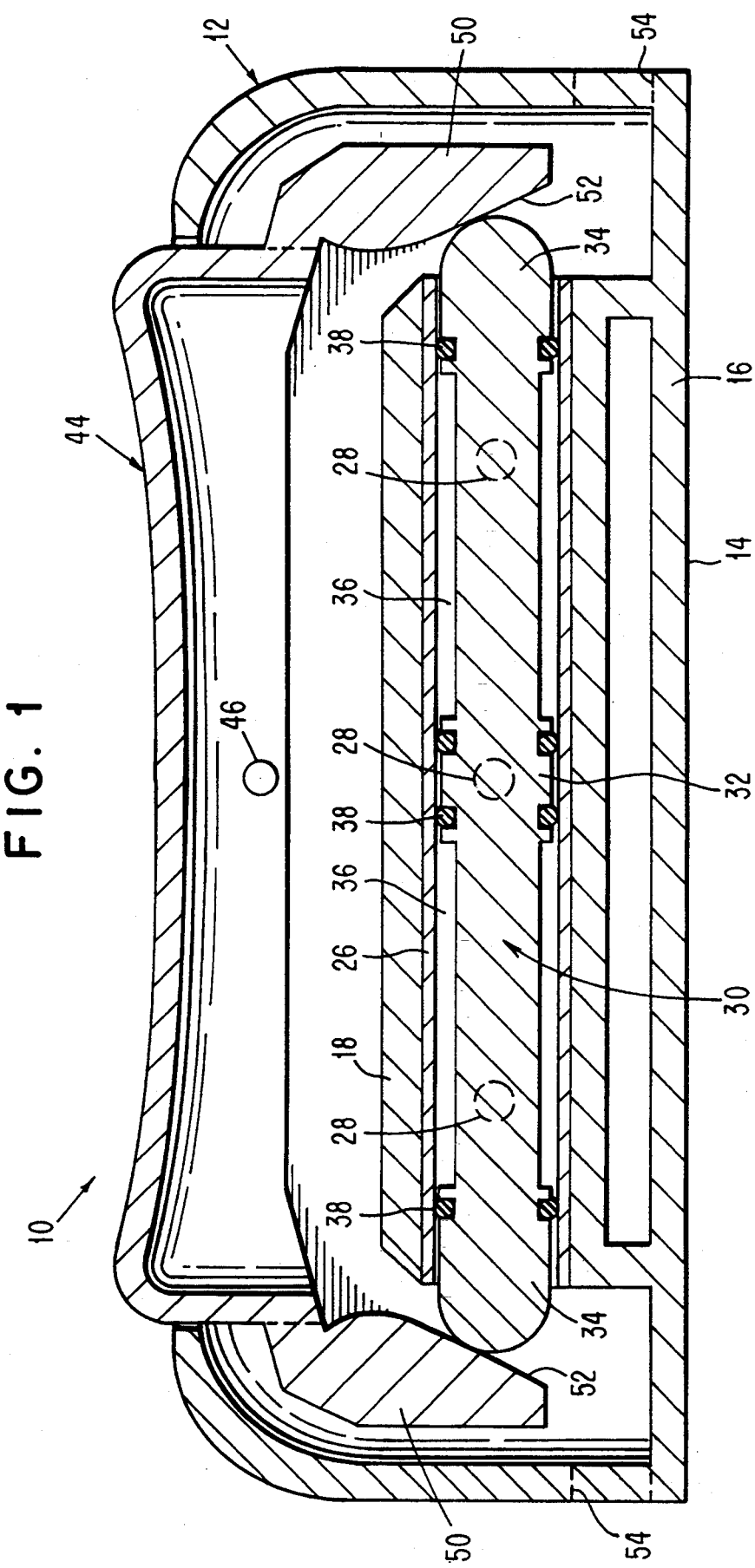
FIG. 1 is a longitudinal sectional view through the novel switching valve in its neutral position.

A switching valve 10 consists of a housing 12 which is approximately prism-shaped, though rounded at the edges, with a flat bottom surface 14, which is rectangular in shape and has a length-to-width ratio of about 2:1. Formed integrally with the bottom of the housing 16, there is a bearing jacket 18, the longitudinal axis of which passes through the longitudinal central plane of the housing 12. On one side wall 20 of the housing 12, there are a series of three screw necks 22, which are integrally connected to the bearing jacket by means of coaxial connecting elements 24. The central connection 22 is in the central transverse plane of the housing 12, and the two other connections have the same longitudinal spacing from said central connection. The connecting sections 24 terminate at right angles in the bearing jacket 18, and the plane of the axes of the three central connections 22 intersects the axis of the bearing jacket 18.

Inserted in the bearing jacket 18 is a bushing 26 of the same length, which has three holes 28 disposed along a surface line of the bushing 26 with the same mutual spacing as the central connections 22. Each central connection 22 thus has a hole 28 of the bushing 26 assigned to it coaxially. A valve body 30 is mounted in the bushing 26 such that it can be displaced longitudinally. The valve body 30 is longer than the bushing 26, and, in its neutral position, it protrudes at the front over the bushing 26 on both sides (FIG. 1). The valve body 30 has a central collar 32 and two end collars 34, so that two elongate annular chambers 36 are formed in each case between one end collar 34 and the central collar 32. Disposed in each of these collars 32, 34 are O-rings 38. The central collar 32 has two O-rings 38 spaced apart, so that, in the neutral position shown in FIG. 1, the central hole 28 of the bushing 26 is sealed on both sides. The two elongate annular chambers 36 have a length at least equal to the distance between the outer edges of two adjacent holes 28.

In the top wall 40 of the housing 12, there is a recess 42 approximately rectangular in outline, in which a rocker 44 is pivotably mounted about a transverse axis 46. The swivel axis 46 is in the transverse central plane of the housing 12,. i.e. precisely above the central hole 28 of the bushing 26. The axis 46 is mounted in the two side walls of the housing 12 and, in the embodiment, also passes through two side walls 48, which guide the rocker 44 along the longitudinal sides. In the neutral position (FIG. 1), the upper part of the rocker protrudes out of the housing 12. At the two longitudinal ends, the rocker 44 has one operating extension 50 in each case, which, in the neutral position of the rocker 44, contacts the respective front end of the valve body 30 and protrudes downwards over the longitudinal axis of the valve body 30. Each operating extension 50 has an operating surface 52, which is arched in the embodiment seen in longitudinal section, though, where appropriate, it can also be designed flat at a corresponding angle. The arched shape of the surfaces 52 is determined in such a way that the operating surfaces 52 contact both rounded ends of the valve body 30 in all the swivelling positions of the rocker 44. This inherently requires that the operating surfaces 52 are shaped so that, as measured along a longitudinal axis of the valve body 30, distances between contact points between the valve body ends and the operating surfaces, stay substantially the same, at least throughout a major part of the pivotable range of movement of the rocker 44.

Figure 2:
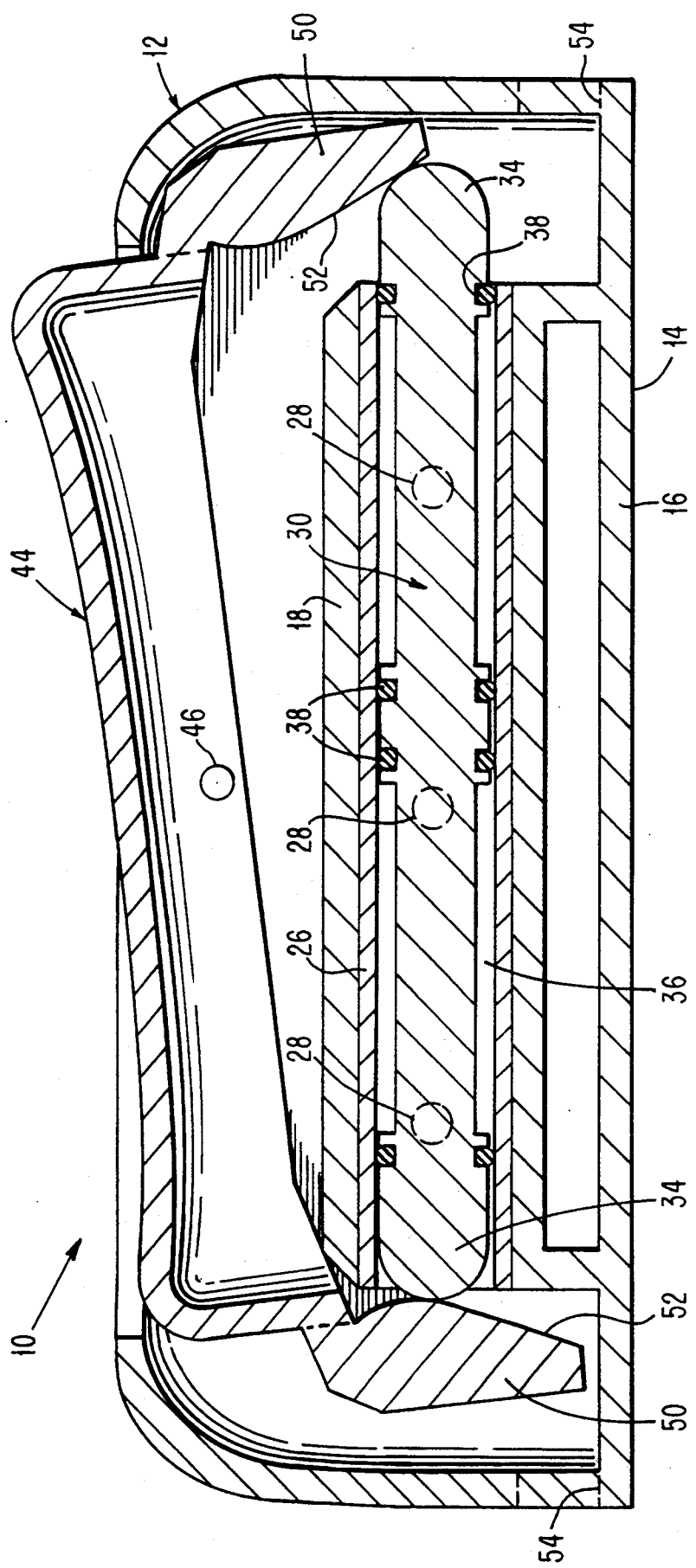
FIG. 2 is a sectional view similar to FIG. 1, though in one of the two switching positions of the switching valve.
Figure 3:
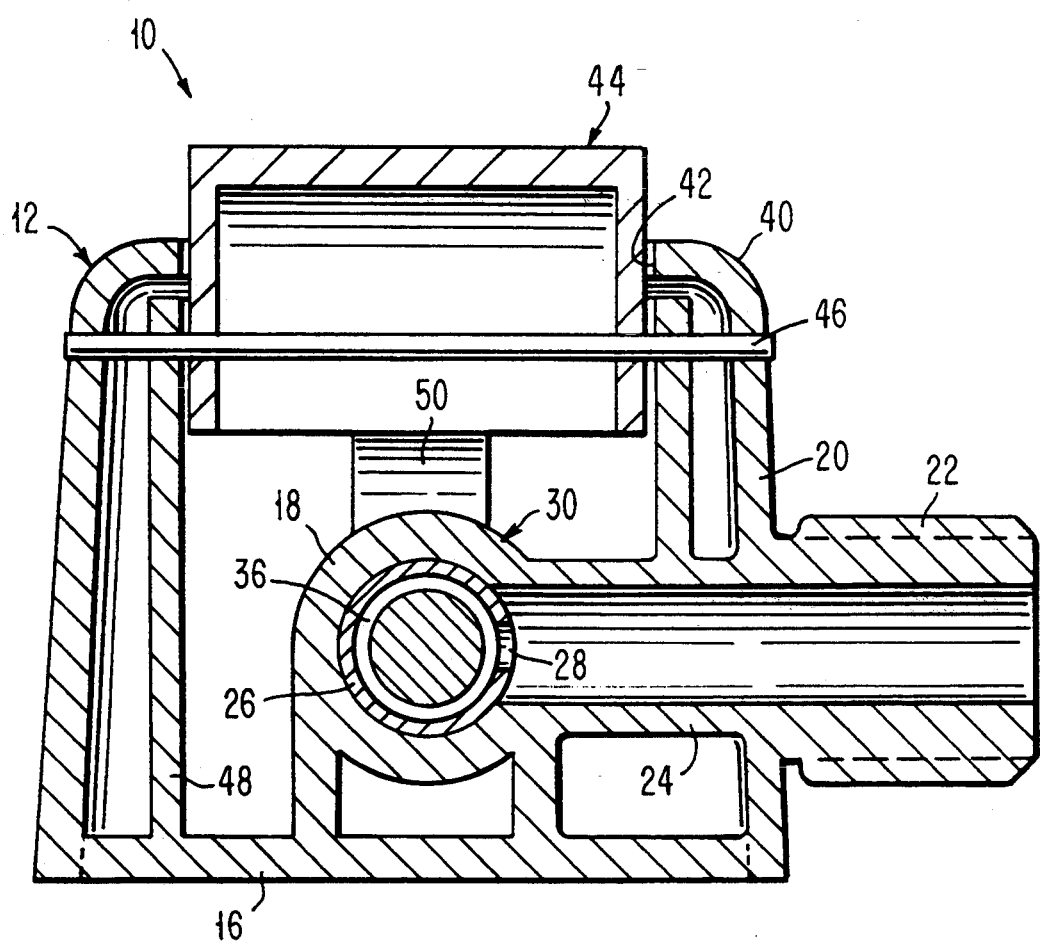
FIG. 3 is a cross-sectional view through the switching valve according to FIG. 1.

If, therefore, the rocker 44 is swivelled out of the neutral position according to FIG. 1 to one switching position according to FIG. 2, the left-hand operating extension 50 presses the valve body 30 so far to the right that the left-hand elongate annular channel 36 connects the central hole 28 with the left-hand hole 28 of the bushing 26. The right-hand hole 28 then remains sealed towards the central hole 28. If the end of the rocker 44, which is on the right in FIG. 2, is operated, the right-hand operating extension 50 pushes the valve body 30 to the left as far as the neutral position, and, if it is pressed down again, beyond that neutral position, so that the right-hand hole 28 communicates with the central hole 28 of the bushing 26.

The rocker 44, with its two operating extensions 50, thus forms a fork with a clear length equal to the length of the valve body 30.

To attach the housing 12 to a building wall, there are two apertures 54 formed in the narrow side walls of the housing 12. These apertures 54 can be circular and serve to receive a journal formed on the wall-mounting elements (not shown). It goes without saying that the wall-mounting elements can also be formed integrally with the housing 12 in the form of angle brackets. The housing 12 can thus be fixed to a bathroom wall very easily in any position, by means of two screws, in such a way that the housing 16 is resting against the wall of the building, and the three connecting sleeves 22 are pointing downwards.

I claim:

1. Switching valve for connection to a bathtub mixer tap, comprising: a housing having a bearing jacket therein and a top wall with an aperture; an elongated cylindrical chamber having a longitudinal axis and opening at opposite ends of the bearing jacket; two outflow connections and an inflow connection between said outflow connection, said connections all terminating in said chamber at right angles to the longitudinal axis of the chamber; a valve body mounted in said chamber for longitudinal displacement between opposite working positions and an intermediate neutral position at which the valve body protrudes at both ends out of the chamber, the valve body having a central collar and defining a pair of flow channels each one communicating with one of the two outflow connections so that, in the neutral position the inflow connection is closed by the central collar of the valve body which is between said pair of flow channels, and in each working position the inlet connection communicates with one of the outflow connections via one of said pair of flow channels; a rocker protruding partially out of the aperture in the top wall of the housing and pivotably mounted in the housing about a central transverse swivel axis, the rocker having downwardly extending operating arms at each one of opposite ends thereof respectively, said operating arms provided with operating surfaces respectively facing one another and contacting the ends of the valve body respectively, the operating arms forming mirror images with respect to a central transverse plane of symmetry of the housing and the central transverse swivel axis of the rocker extending within said central transverse plane.

2. Switching valve as claimed in claim 1, wherein the operating surfaces are shaped so that, as measured along a longitudinal axis of the valve body, distances between contact points between the valve body ends and the operating surfaces of the two operating arms which are facing each other, stay substantially the same at least throughout a major part of a pivotal range of movement of the rocker.

3. Switching valve as claimed in claim 1, wherein the aperture in the top wall of the housing is substantially rectangular in shape and has a length-to-width ratio of at least 2:1.

4. Switching valve as claimed in claim 1, wherein the connections are in a row with the same longitudinal spacing therebetween, along a longitudinal side wall of the housing.

5. Switching valve as claimed in claim 1, wherein the housing and the rocker are injection-moulded plastic parts, and the connections are formed integrally with the housing as screw necks.

6. Switching valve as claimed in claim 1, wherein the cylindrical chamber is formed in a bushing forming the bearing jacket, the bushing being firmly anchored in a bore of the housing.

* * * * *